(12) United States Patent  
Lee

(10) Patent No.: US 9,049,429 B2  
(45) Date of Patent: Jun. 2, 2015

(54) CONNECTION PROBLEM DETERMINATION METHOD AND CONNECTION PROBLEM DETERMINATION APPARATUS FOR IMAGE INPUT DEVICE

(71) Applicant: REALHUB CORP., LTD., Busan (KR)

(72) Inventor: Kang-seok Lee, Busan (KR)

(73) Assignee: Realhub Corp. Ltd. (KR)

( * ) Notice: Subject to any disclaimer, the term of this patent is extended or adjusted under 35 U.S.C. 154(b) by 0 days.

(21) Appl. No.: 14/060,923

(22) Filed: Oct. 23, 2013

(65) Prior Publication Data

US 2014/0125817 A1 May 8, 2014

Related U.S. Application Data

(63) Continuation of application No. PCT/KR2012/003208, filed on Apr. 26, 2012.

(30) Foreign Application Priority Data

Aug. 5, 2011 (KR) .......................... 10-2011-0078240

(51) Int. Cl.
| H04N 17/00 | (2006.01) |
| H04L 12/26 | (2006.01) |
| H04N 7/18 | (2006.01) |
| H04L 29/06 | (2006.01) |

(52) U.S. Cl.
CPC .......... *H04N 17/004* (2013.01); *H04L 43/0811* (2013.01); *H04L 43/0852* (2013.01); *H04N 7/181* (2013.01); *H04L 43/50* (2013.01); *H04L 43/0858* (2013.01); *H04L 43/16* (2013.01); *H04L 69/162* (2013.01)

(58) Field of Classification Search
USPC .......... 348/181, 552, 553, 512–514, 516, 517
See application file for complete search history.

(56) References Cited

U.S. PATENT DOCUMENTS

| 6,493,034 | B1* | 12/2002 | Elberbaum | 348/512 |
|---|---|---|---|---|
| 7,382,244 | B1* | 6/2008 | Donovan et al. | 340/506 |
| 7,626,882 | B2* | 12/2009 | Yang et al. | 365/226 |
| 7,889,452 | B2* | 2/2011 | Bloodworth et al. | 360/61 |
| 2007/0155403 | A1* | 7/2007 | Bishop | 455/456.1 |
| 2008/0151639 | A1* | 6/2008 | Yang et al. | 365/185.23 |
| 2009/0002157 | A1* | 1/2009 | Donovan et al. | 340/540 |
| 2010/0135643 | A1* | 6/2010 | Fleming | 386/117 |
| 2012/0176929 | A1* | 7/2012 | Choi | 370/253 |
| 2013/0093898 | A1* | 4/2013 | Tink et al. | 348/159 |
| 2013/0108994 | A1* | 5/2013 | Srinivasa et al. | 434/156 |
| 2013/0156092 | A1* | 6/2013 | Li et al. | 375/240.01 |
| 2013/0156095 | A1* | 6/2013 | Li et al. | 375/240.02 |
| 2013/0219031 | A1* | 8/2013 | Schulz et al. | 709/221 |

* cited by examiner

*Primary Examiner* — Paulos M Natnael  
(74) *Attorney, Agent, or Firm* — Park & Associates IP Law, P.C.

(57) ABSTRACT

The present invention relates to a connection problem determination method and a connection problem determination apparatus for an image input device, and the connection problem determination apparatus, for an image input device, which includes: a network connection sensing unit which senses the network connection between a network video record system and a network-connectable image input device which provides a specific image; a timer which generates signals at regular time intervals in accordance with a clock pulse; a time delay measuring unit which measures a time delay on the basis of the signals from the timer if no network connection is sensed; and a connection problem determination unit which determines that there is a connection problem if the time delay is a predetermined threshold value or greater.

5 Claims, 4 Drawing Sheets

CONNECTION PROBLEM DETERMINATION METHOD AND CONNECTION PROBLEM DETERMINATION APPARATUS FOR IMAGE INPUT DEVICE

REFERENCE TO RELATED APPLICATIONS

This is a continuation of pending International Patent Application PCT/KR2012/003208 filed on Apr. 26, 2012, which designates the United States and claims priority of Korean Patent Application No. 10-2011-0078240 filed on Aug. 5, 2011, the entire contents of which are incorporated herein by reference.

FIELD OF THE INVENTION

The present invention relates to an apparatus and method for determining the connection failure of an image input device and, more particularly, to an apparatus and method for determining the connection failure of an image input device, which are capable of determining the connection failure of an individual image input device that is connected over a network.

BACKGROUND OF THE INVENTION

Network Video Record (NVR) systems are being widely used for the purposes of crime prevention, traffic control, information collection, etc. Such an NVR system is connected to a plurality of image input devices over a network, and is operated at all times.

Accordingly, although it is essential that a NVR system should be stably operated over a long time and should be normally operated without requiring additional manpower, a failure may occur in a network connection with an image input device because of the disconnection of a cable or the overload of a network.

Conventional technology has a problem determining a network connection failure between a server and an image input device in that the connection failure should be determined by manual operation or irregular determination, such as the determination of logs that have not been stored.

That is, the conventional technology NVR systems are problematic in that they cannot easily determine a connection failure that occurs when an image is received from an individual image input device, such that it takes a long time to determine a connection failure attributable to the disconnection of a cable or the overload of a network and it is ineffective to perform irregular human monitoring.

SUMMARY OF THE INVENTION

An object of the present invention is to provide an apparatus and method for determining the connection failure of an image input device, which are capable of easily determining the network connection failure of an individual image input device in an NVR system.

Objects of the present invention are not limited to the above-described object, and other objects that have not been described above will be apparent from the following description.

In order to accomplish the above object, in accordance with an aspect of the present invention, there is provided an apparatus for determining the connection failure of an image input device, including a network connection detection unit configured to detect a network connection between at least one image input device for providing predetermined images and enabling a network connection, and a network video record (NVR) system; a timer configured to generate signals at regular time intervals in response to clock pulses; a time delay measurement unit configured to measure a time delay based on the signals of the timer if the network connection is not detected; and a connection failure determination unit configured to determine that a connection failure has occurred if the time delay is equal to or longer than a preset threshold value.

In accordance with another aspect of the present invention, there is provided a method of determining a connection failure of an image input device, including detecting a network connection between at least one image input device for providing predetermined images and enabling a network connection, and an NVR system; measuring a time delay if the network connection is not detected; and determining that a connection failure has occurred if the time delay is equal to or longer than a preset threshold value.

In accordance with the present invention, there are provided the apparatus and method for determining the connection failure of an image input device, which are capable of easily determining the network connection failure of an individual image input device in an NVR system.

Furthermore, there are provided the apparatus and method for determining the connection failure of an image input device, which are capable of determining the network connection failure of an individual image input device using information about the video transmission method of the image input device (for example, an NTSC method, a PAL method, a SECAM method, or the like) and socket information about an Internet communication protocol (TCP/IP) that can be received based on the network connection of the image input device and a connection with video output.

Furthermore, In accordance with the present invention, if time delays are generated from a plurality of network connections at the same time, connection failures having similar time delay characteristics can be effectively determined.

DETAILED DESCRIPTION OF THE INVENTION

Advantages, features and implementation methods of the present invention will be apparent from embodiments that will be described in detail below in conjunction with the accompanying drawings. However, the present invention is not limited to embodiments that will be disclosed below, and but may be implemented in various different forms. These embodiments are merely provided to make the disclosure of the present invention complete and to make those having ordinary knowledge in the art to which the present invention pertains completely understand the scope of the present invention. The present invention is defined only by descriptions of the claims. Meanwhile, the terms used herein are intended to illustrate embodiments, but are not intended to limit the present invention. In the present specification, terms in singular form include the plural. Embodiments of the present invention will be described in detail with reference to the accompanying drawings.

An apparatus for determining the connection failure of an image input device according to an embodiment of the present invention will be described with reference to FIG. 1.

Figure 1:
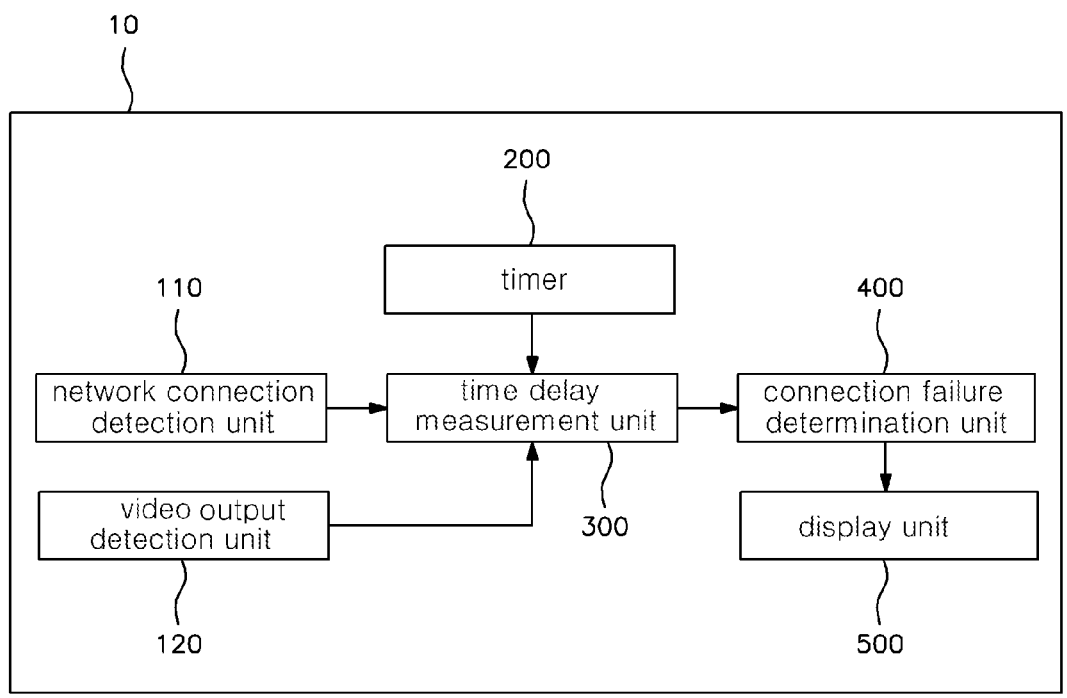
FIG. 1 is a block diagram illustrating an apparatus for determining the connection failure of an image input device according to an embodiment of the present invention.

FIG. 1 is a block diagram illustrating the apparatus for determining the connection failure of an image input device according to this embodiment of the present invention.

Referring to FIG. 1, the apparatus 10 for determining the connection failure of an image input device according to this embodiment of the present invention includes a network connection detection unit 110, a video output detection unit 120, a timer 200, a time delay measurement unit 300, a connection failure determination unit 400, and a display unit 500.

The network connection detection unit 110 detects a network connection between an individual image input device configured to provide predetermined images and to enable a network connection, and a network video record (NVR) system.

In this case, the image input device may be a closed circuit television, a camera, a camcorder or the like, and should be interpreted as being based on a concept including an image storage medium (for example, memory) that stores images input from the image input device.

The network connection detection unit 110 may be directly connected to the image input device and a network or a network between the NVR system and the image input device, and may detect the network connection of the image input device.

Furthermore, the network connection detection unit 110 may detect the network connection based on whether socket information about an Internet communication protocol (TCP/IP) that is received in the case of a network connection is received.

In this case, the socket information may include address information that is used to perform the unique data communication of the image input device.

The network connection detection unit 110 may detect the network connection based on whether information about the video transmission method of the image input device is received.

In this case, the video transmission method may be at least one of an NTSC method, a PAL method and a SECAM method.

Meanwhile, the network connection detection unit 110 may detect the network connection based on whether at least one of the socket information about the communication protocol and the information about the video transmission method is received in the case where both the socket information about the communication protocol and the information about the video transmission method can be received.

When the image input device outputs an analog image signal, the video output detection unit 120 determines a video transmission method supported by the connected image input device, and detects a connection with video output.

The timer 200 generates signals at regular time intervals in response to clock pulses.

When at least one of the network connection of the image input device and the connection with video output is not detected, the time delay measurement unit 300 measures a time delay based on the signals of the timer.

The connection failure determination unit 400 determines that a connection failure has occurred if the time delay is equal to or longer than a preset threshold value.

In this case, the threshold value is a reference that is used to determine whether a connection failure has occurred, and may be set (for example, to 1 second, or 1 hour) in accordance with the characteristics of one of various connection failures, such as the breakdown of the image input device, a connection failure attributable the failure of the performance of communication based on a network connection, or the like.

Meanwhile, the connection failure determination unit 400 determines that a connection failure has occurred if the time delay is equal to or longer than a preset threshold value.

Meanwhile, the connection failure determination unit 400 may cluster a plurality of network connections and video outputs for which the time delay is equal to or longer than a preset threshold value based on at least one characteristic of time delays and network connections (for example, measured time delays, the number of time delays, or IP addresses), and may determine whether a connection failure has occurred based on the results of the clustering.

In this case, a K-means clustering technique may be applied to the clustering.

Accordingly, when a time delay occurs based on a plurality of network connections at the same time, the connection failure determination unit 400 may effectively determine connection failures having similar characteristics.

The display unit 500 displays the connection failure using a screen or voice.

Figure 2:
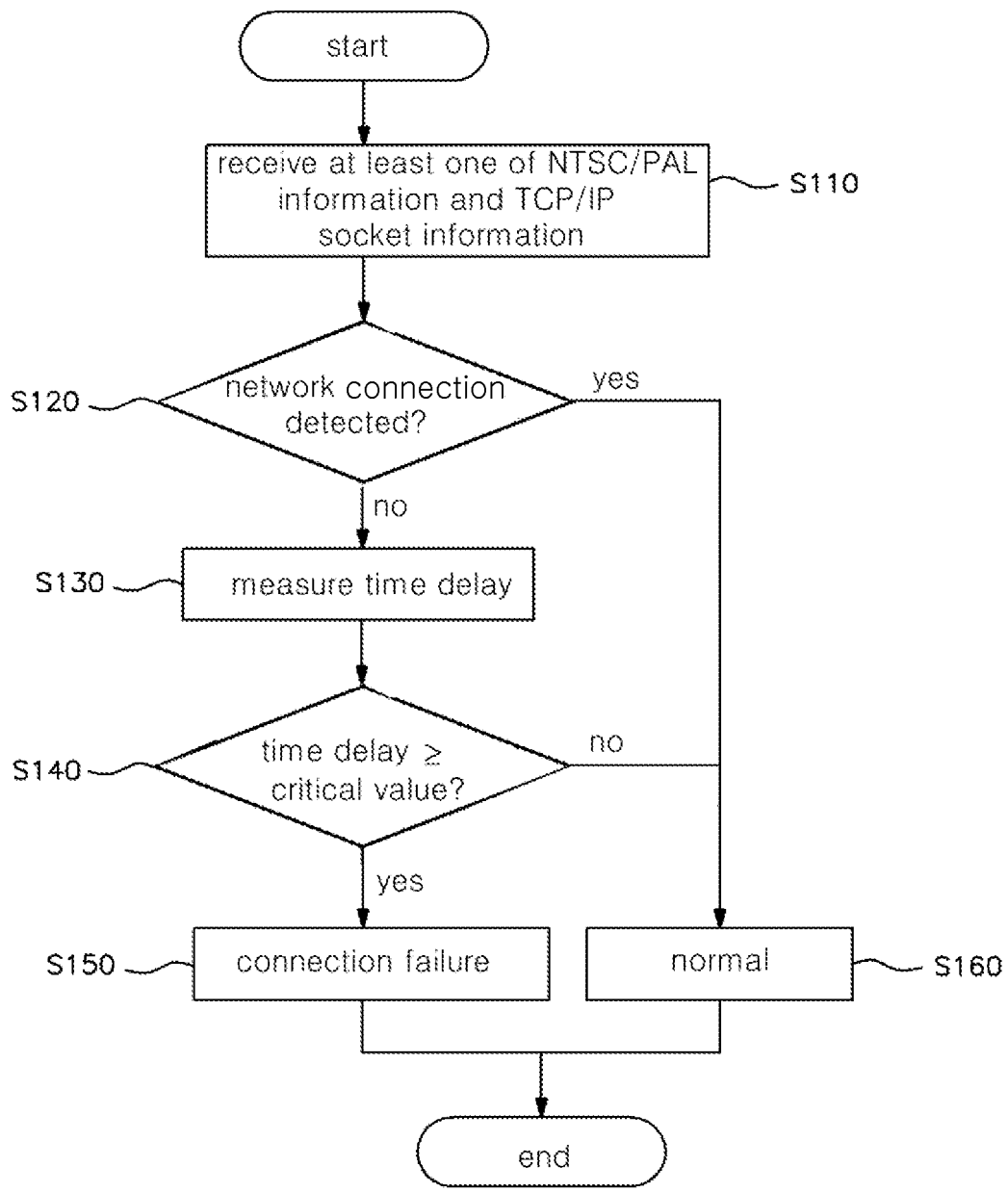
FIG. 2 is a flowchart illustrating a method of determining the connection failure of an image input device according to another embodiment of the present invention.

A method of determining the connection failure of an image input device according to another embodiment of the present invention will be described with reference to FIG. 2. FIG. 2 is a flowchart illustrating the method of determining the connection failure of an image input device according to this embodiment of the present invention.

Referring to FIG. 2, first, at least one of information about the video transmission method of an individual image input device (for example, an NTSC method, a PAL method, a SECAM method or the like) and socket information about an Internet communication protocol (TCP/IP) that can be received based on the network connection of the image input device and a connection with video output is received at step S110.

Thereafter, the network connection of the image input device capable of network connection is detected at step S120.

In this case, the network connection may be detected depending on whether socket information about an Internet communication protocol (TCP/IP) that is received based on a network connection is received at step S120.

Alternatively, the network connection may be detected depending on whether information about the video transmission method of the image input device has been received at step S120.

In this case, the video transmission method is at least one of an NTSC method, a PAL method and a SECAM method.

Thereafter, if at least one of the network connection of the image input device and a connection with video output is not detected, a time delay is measured based on the signals of the timer at step S130.

Thereafter, it is determined whether the time delay is equal to or longer than a preset threshold value at step S140, and, if the time delay is equal to or longer than the threshold value, it is determined that a connection failure has occurred at step S150.

Meanwhile, a plurality of network connections and video outputs for which the time delay is equal to or longer than a preset threshold value may be clustered based on at least one characteristic of time delays and network connections (for example, measured time delays, the number of time delays, or IP addresses) and a group of network connections or video outputs may be determined to have a connection failure at step S150.

Meanwhile, if a network connection is detected or the time delay is shorter than the threshold value, it is determined that the connection of the image input device is normal at step S160.

Figure 3:
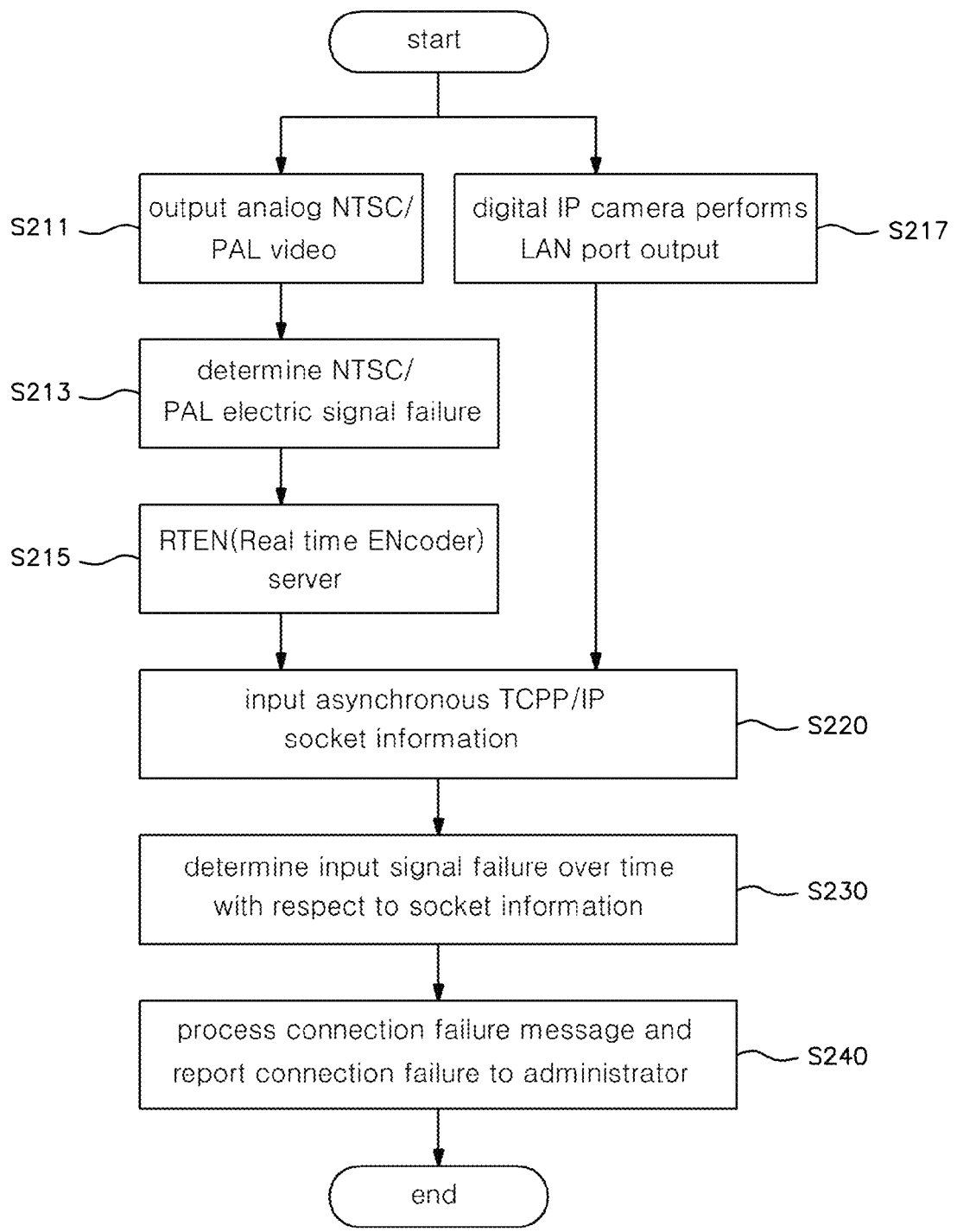
FIG. 3 is a flowchart illustrating a method of determining the connection failure of an image input device according to still another embodiment of the present invention.

A method of determining the connection failure of an image input device according to still another embodiment of the present invention, which may be applied to the case where asynchronous TCP/IP socket information is received from an individual image input device, will be described with reference to FIG. 2. FIG. 3 is a flowchart illustrating the method of determining the connection failure of an image input device according to this embodiment of the present invention.

Referring to FIG. 3, the method of determining the connection failure of an image input device according to this embodiment of the present invention is configured to connect with a real time encoder (RTEN) server connected to analog video output or the output of an individual digital image input device adapted to be able to be directly connected to a network, such as a LAN, to receive asynchronous TCP/IP socket information, and to determine the connection failure of the image input device.

More specifically, analog video output based on a NTSC/PAL method or the like is detected at step S211. Thereafter, a signal failure is determined whether an NTSC/PAL electrical signal is received at step S213.

The RTEN server encodes analog video output into a digital signal, connects with a predetermined network in accordance with an Internet communication protocol, and outputs the digital signal to a network at step S215.

Furthermore, the digital image input device, such as a digital IP camera, directly connects with a network and outputs the digital signal to the network at step S217.

Thereafter, the apparatus 10 for determining the connection failure of an image input device receives asynchronous TCP/IP socket information from an individual image input device at step S220, and determines whether a connection failure has occurred whether there is input socket information.

That is, at step S230, time is measured to determine that a connection failure has occurred if there is no input socket information, and it is determined that an input signal failure has occurred over time for each piece of socket information if the measured delay time is equal to or longer than a preset threshold value.

Thereafter, message processing regarding the connection failure is performed and the results thereof are output using a screen or voice, thereby reporting it to an administrator at step S240.

Figure 4:
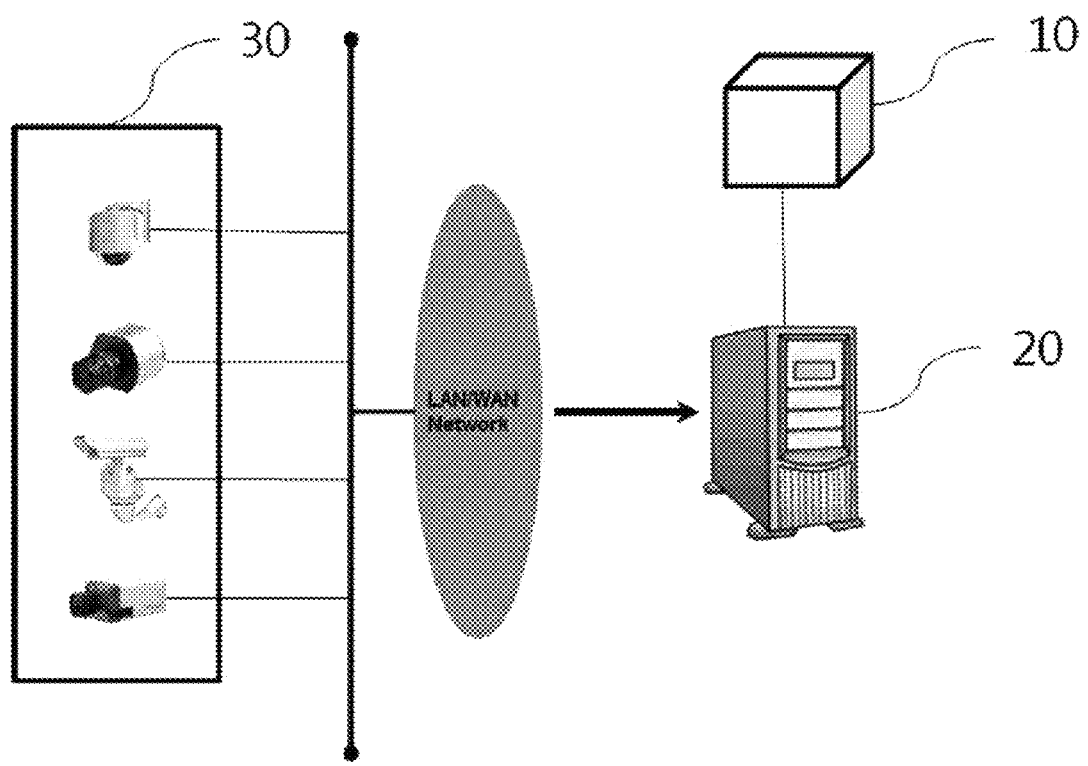
FIG. 4 is a conceptual diagram illustrating an NVR system to which an apparatus for determining the connection failure of an image input device according to an embodiment of the present invention has been applied.

An NVR system to which the apparatus 10 for determining the connection failure of an image input device according to an embodiment of the present invention has been applied will be described below with reference to FIG. 4. FIG. 4 is a conceptual diagram illustrating the NVR system according to this embodiment of the present invention.

The NVR system according to this embodiment of the present invention includes the apparatus 10 for determining a connection failure, an integrated control server 20, and image input devices 30.

Since the apparatus 10 for determining a connection failure is the apparatus 10 for determining the connection failure of an image input device according to the embodiment of the present invention, which has been described with reference to FIG. 1, a detailed description thereof will be omitted.

The image input devices 30, such as a camera and a camcorder, are connected to the integrated control server 20 over a network, and the integrated control server 20 manages images provided by the image input devices 30 by storing, deleting and maintaining the images.

Meanwhile, the apparatus 10 for determining a connection failure connects with the network separately from the integrated control server 30, and may determine a network connection failure between the integrated control server 20 and each of the image input devices 30.

Furthermore, as still another embodiment, the apparatus 10 for determining a connection failure may be included in the integrated control server 30 as part thereof, and may determine a network connection failure between the integrated control server 20 and each of the image input devices 30.

It will be appreciated by those having ordinary knowledge in the art to which the present invention pertains that the present invention may be practiced in other specific forms without changing the technical spirit and essential features of the present invention. Therefore, it should be understood that the above-described embodiments are illustrative but not restrictive in all aspects. The scope of the present invention is defined by the scope of the attached claims, rather than the detailed description. It should be appreciated that all variations and modifications derived from the scope of the claims and the equivalent concepts thereof are included in the scope of the present invention.

The present invention relates to the apparatus and method for determining the connection failure of an image input device, and, more particularly, may be utilized in the field of the apparatus and method for determining the connection failure of an image input device, which are capable of determining the connection failure of an individual image input device that is connected over a network.

What is claimed is:

1. An apparatus for determining a connection failure of an image input device, comprising:
    a network connection detection unit configured to detect a network connection between at least one image input device for providing predetermined images and enabling a network connection, and a network video record (NVR) system;
    wherein the network connection detection unit detects the network connection depending on whether socket information about an internet communication protocol that is received based on the network connection is received;
    a timer configured to generate signals at regular time intervals in response to clock pulses;
    a time delay measurement unit configured to measure a time delay based on the signals of the timer if the network connection is not detected;
    a connection failure determination unit configured to determine that a connection failure has occurred if the time delay is equal to or longer than a preset threshold value; and
    a video output detection unit configured to detect a connection of the image input device with video output,
    wherein the time delay measurement unit measures the time delay based on the signals of the timer if the connection with the video output is not detected.

2. A method of determining a connection failure of an image input device, comprising:
    detecting a network connection between at least one image input device for providing predetermined images and an NVR system;

measuring a time delay based on signals of a timer generating the signals at regular intervals in response to clock pulses, if the network connection is not detected; and determining that a connection failure has occurred if the time delay is equal to or longer than a preset threshold value, wherein said detecting the network connection depends on whether socket information about an internet communication protocol (TCP/IP) is received.

3. An apparatus for determining a connection failure of an image input device, comprising:

a network connection detection unit configured to detect a network connection between at least one image input device for providing predetermined images and enabling a network connection, and a network video record (NVR) system;

wherein the network connection detection unit detects the network connection depending on whether socket information about an internet communication protocol that is received based on the network connection is received;

a timer configured to generate signals at regular time intervals in response to clock pulses;

a time delay measurement unit configured to measure a time delay based on the signals of the timer if the network connection is not detected; and a connection failure determination unit configured to determine that a connection failure has occurred if the time delay is equal to or longer than a preset threshold value, wherein the socket information includes address information of an image input device that is used to perform the unique data communication between the image input device and the NVR system.

4. An apparatus for determining a connection failure of an image input device, comprising:

a network connection detection unit configured to detect a network connection between at least one image input device for providing predetermined images and enabling a network connection, and a network video record (NVR) system;

a timer configured to generate signals at regular time intervals in response to clock pulses;

a time delay measurement unit configured to measure a time delay based on the signals of the timer if the network connection is not detected; and a connection failure determination unit configured to determine that a connection failure has occurred if the time delay is equal to or longer than a preset threshold value, wherein the connection failure determination unit is configured to differentiate between connection failure types including the connection failure due to breakdown of an image input device and the connection failure attributable to network performance.

5. An apparatus for determining a connection failure of an image input device, comprising:

a network connection detection unit configured to detect a network connection between at least one image input device for providing predetermined images and enabling a network connection, and a network video record (NVR) system;

a timer configured to generate signals at regular time intervals in response to clock pulses;

a time delay measurement unit configured to measure a time delay based on the signals of the timer if the network connection is not detected; and a connection failure determination unit configured to determine that a connection failure has occurred if the time delay is equal to or longer than a preset threshold value, wherein the connection failure determination unit is configured to determine the connection failure by clustering at least one of a measured time delays, a number occurrences of time delays and the socket information.

\* \* \* \* \*